US011178267B1

(12) United States Patent
Delaney et al.

(10) Patent No.: US 11,178,267 B1
(45) Date of Patent: Nov. 16, 2021

(54) MANAGING ACCESSIBILITY FEATURES FOR MOBILE DEVICE

(71) Applicant: Micron Technology, Inc., Boise, ID (US)

(72) Inventors: Claudia A. Delaney, Garden City, ID (US); Bhumika Chhabra, Boise, ID (US); Madison E. Wale, Boise, ID (US); Elsie de la Garza Villarreal, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/891,659

(22) Filed: Jun. 3, 2020

(51) Int. Cl.
*H04M 1/247* (2021.01)
*G06F 3/16* (2006.01)
*G06F 3/0481* (2013.01)
*G06F 3/0488* (2013.01)
*H04M 1/72403* (2021.01)

(52) U.S. Cl.
CPC ...... *H04M 1/2474* (2013.01); *G06F 3/04817* (2013.01); *G06F 3/04883* (2013.01); *G06F 3/167* (2013.01); *H04M 1/72403* (2021.01)

(58) Field of Classification Search
CPC combination set(s) only.
See application file for complete search history.

(56) References Cited

U.S. PATENT DOCUMENTS

| 2010/0016014 A1* | 1/2010 | White | H04M 19/044 455/556.1 |
| 2013/0331123 A1* | 12/2013 | Ayalur | G01S 5/0252 455/456.1 |
| 2014/0302835 A1 | 10/2014 | Henderson et al. | |
| 2015/0055801 A1 | 2/2015 | Wu | |
| 2015/0079962 A1* | 3/2015 | Baker | H04W 4/023 455/418 |
| 2017/0187866 A1 | 6/2017 | Li | |
| 2017/0228140 A1* | 8/2017 | Han | G06F 3/0412 |

FOREIGN PATENT DOCUMENTS

| JP | 2011124864 A | 6/2011 |
| KR | 20160009973 A | 1/2016 |

OTHER PUBLICATIONS

International Application No. PCT/US2021/032671—International Search Report and Written Opinion, dated Sep. 6, 2021, 9 pages.

* cited by examiner

*Primary Examiner* — Phung-Hoang J Nguyen
(74) *Attorney, Agent, or Firm* — Perkins Coie LLP

(57) ABSTRACT

Methods and apparatuses for managing accessibility features for mobile devices are described. Accessibility features may facilitate a user to interface with his/her mobile device and may be referred to as user-interface parameters configured to generate output or to receive input. The mobile device may generate an accessibility icon corresponding to one or more user-interface parameters selected by the user. The mobile device may also store a set of values provided by the user, where individual values correspond to individual user-interface parameters. Subsequently, the mobile device displays the accessibility icon such that the user may actuate the accessibility icon to adjust the user-interface parameters based on the values. Further, the user-interface parameters may be adjusted to more than one set of values. The mobile device may generate multiple accessibility icons that each correspond to different collections of the user-interface parameters.

14 Claims, 5 Drawing Sheets

MANAGING ACCESSIBILITY FEATURES FOR MOBILE DEVICE

TECHNICAL FIELD

The present disclosure generally relates to mobile devices, and more particularly relates to managing accessibility features for mobile devices.

BACKGROUND

Mobile devices (e.g., cellular phones, mobile phones, tablets, etc.) are widely deployed to help users in different environments. Such mobile devices are equipped with various features that help users to efficiently interact with their mobile devices, such as font sizes, ringtone volumes, brightness levels for screens, or the like. For example, the user may set the ringtone volume loud enough for the user at home, if the user experiences impaired hearing, after navigating through multiple screens to find the ringtone volume setting feature. The user, however, may find the ringtone volume inappropriate in a library, and mute the ringtone volume, after repeating the process of finding the ringtone volume setting feature. In some cases, the user may want to adjust multiple accessibility features. Accordingly, the user may need to engage in repetitive and tedious efforts to locate each and every accessibility feature by navigating through numerous screens and adjust settings for individual features, a task which can be especially difficult for users with visual, motor, and/or other physical challenges.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
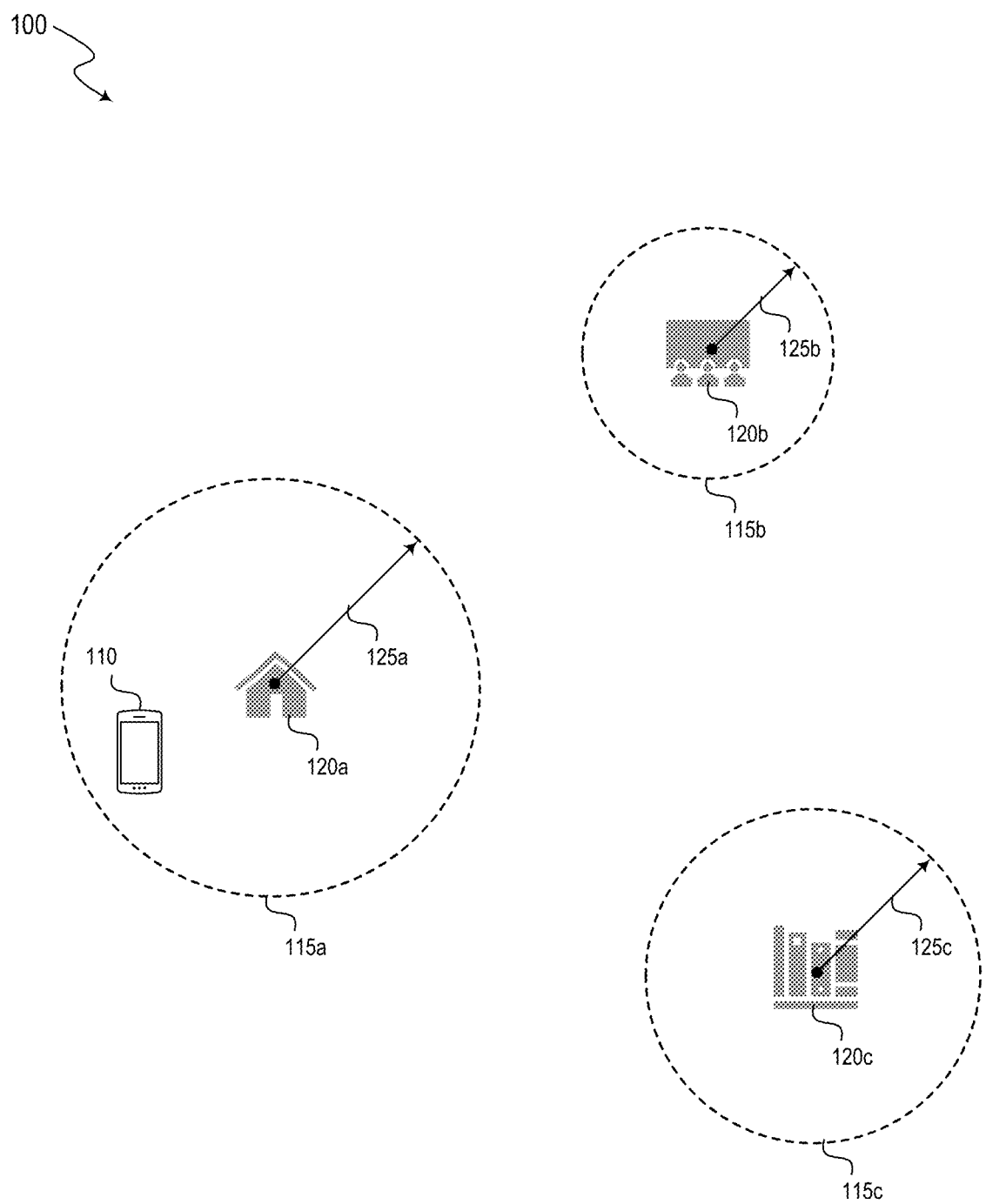
FIG. 1 is a schematic diagram illustrating various environments for managing accessibility features for mobile devices in accordance with embodiments of the present technology.

Mobile devices (e.g., cellular phones) are ubiquitous in contemporary lifestyle, assisting users of the mobile devices in many business and/or personal environments. The users may access applications and/or functions stored in the mobile devices assisted by various features designed to improve access ("accessibility features") of the mobile devices. Such accessibility features can facilitate the users interfacing with the mobile devices and may be referred to as user-interface parameters. The user-interface parameters may be configured to generate output to the users or to receive input from the users, or both. In some embodiments, the user-interface parameters include a size of various items to display on the screen (e.g., characters, graphical elements and/or icons corresponding to applications of the mobile device), a volume level (e.g., a ringtone volume), a vibration mode, an illumination alert mode, a brightness level of the screen, a voice-recognition sensitivity level, a gesture-perception sensitivity level, or the like.

The users may set certain user-interface parameters of the mobile devices (e.g., ringtone volumes, font sizes, brightness levels of the screen) to convenient levels for them based on various environments, such as their particular needs, different situations they may be in, and/or different tasks they may carry out. For example, to accommodate a condition of impaired vision, a user may set a font size large enough for the user to conveniently write and/or read text messages. In another example, a user may experience hearing impairment challenges and set a ringtone volume of the cell phone loud enough for the user when at home such that the user can easily hear a ringtone of an incoming call (or text messages, emails, etc.). Moreover, the user may also configure a vibration mode or an illumination alert mode of the cellular phone such that the user may notice the vibration or several illumination device flashes of the cellular phone as well, upon receiving the incoming call.

The user-interface parameters set by the user, which may be tailored to certain environments (e.g., the loud ringtone volume at the user's home), however, may be inappropriate in other environments (e.g., in a library, at a funeral service, etc.). Accordingly, the user may want to change (e.g., reduce, mute) the ringtone volume and need to navigate through multiple screens to find the user-interface parameter (e.g., the accessibility feature) for adjusting the ringtone volume. Afterwards, the user has to repeat the same process to restore the ringtone volume, for example, when the user returns home.

Further, the user may need to set different user-interface parameters based on tasks (or applications) the user may carry out (or utilize). For example, the user may set the font size large (or small) when the user writes and/or reads text messages, while the user may adjust the brightness of the screen darker (or brighter) when the user watches multimedia content, based on background illumination. In general, navigating through multiple screens to find certain user-interface parameters (accessibility features) may not be straightforward, and additionally, setting multiple user-interface parameters on or off (or otherwise adjusting them) each time the user changes his/her environments and/or embarks on a different task can be tedious and time-consuming, and may be especially challenging for users with visual, motor, and/or other physical difficulties.

Embodiments of the present technology can facilitate a mobile device to adjust multiple accessibility features to the settings that the user has preconfigured, without requiring the user to spend effort navigating through numerous screens to manually adjust individual accessibility features. Such a mobile device may be configured to generate an accessibility icon (e.g., a graphic element configured to permit access to one or more user-interface parameters), such as an icon providing a master control of various accessibility features associated with the accessibility icon. In this regard, the mobile device may generate, on a processor of the mobile device, data corresponding the accessibility icon—e.g., the data corresponding to the appearance, location, interactive features, etc. of the accessibility icon to be displayed on the screen. Moreover, the accessibility icon can correspond to a group of user-interface parameters selected by the user. The mobile device may also store a plurality of settings provided by the user, where individual settings of the plurality each correspond to individual user-interface parameters of the group. In some embodiments, the mobile device may generate multiple accessibility icons that each correspond to different groups (e.g., collections) of user-interface parameters.

The mobile device may display the accessibility icon (e.g., the accessibility icon associated with the data) on a screen of the mobile device such that the user may actuate or de-actuate the accessibility icon. That is, if the user actuates the accessibility icon, the mobile device can adjust the user-interface parameters of the group based on the settings that the user has provided (or otherwise preconfigured) such that the user may save efforts and time for locating individual user-interface parameters and manually adjusting the settings for the individual user-interface parameters. Similarly, if the user de-actuate the accessibility icon, the mobile device can adjust the user-interface parameters of the group to corresponding default settings stored in the mobile device. In some embodiments, the user may actuate (or de-actuate) the accessibility icon by touching the accessibility icon, speaking to the mobile device, making a gesture to the mobile device, or any combination thereof.

In some embodiments, the mobile device may display the accessibility icon on a first screen (e.g., a primary screen) that appears, in response to the user activating the mobile device. In some cases, the mobile device may enlarge a size of the accessibility icon from a default size predetermined for graphical elements (e.g., icons) of the mobile device, before displaying the accessibility icon on the first screen. In some embodiments, the mobile device may provide a zoom feature after displaying the accessibility icon using the default size such that the user may adjust (e.g., enlarge, modify) the size of the accessibility icon using the zoom feature for his/her convenience.

In some embodiments, the group of user-interface parameters may correspond to two or more setting. For example, if the user is in a library, the user may set a ringtone volume (e.g., a user-interface parameter) of the mobile device low (or mute). Similarly, if the user is in a shopping mall, the user may set the ringtone volume high (e.g., loud). As such, the mobile device may store a plurality of first settings, as well as a plurality of second settings such that individual user-interface parameters of the group can be set with corresponding first settings of the plurality or corresponding second settings of the plurality.

In some embodiments, the mobile device may be configured to store such geographical information (e.g., geolocations) related to various settings. Further, the mobile device may associate the plurality of first settings and the plurality of second settings with a first geographical reference location (e.g., a library) and a second geographical reference location (e.g., a shopping mall), respectively. Accordingly, the mobile device may determine the user's current location (e.g., based on a global positioning system (GPS) coupled with the mobile device) and adjust the user-interface parameters of the group based on the user's current location. In some cases, the mobile device may prompt the user whether to adjust the user-interface parameters in accordance with the preconfigured settings (e.g., the plurality of first settings, the plurality of second settings).

In this manner, the mobile device may save time and efforts for the user to locate multiple user-interface parameters (e.g., accessibility features) and manually adjusting the settings for the user-interface parameters one at a time. Instead, the user may actuate (or de-actuate) the accessibility icon (e.g., a master control icon) provided by the mobile device to adjust the settings for multiple user-interface parameters with a single action. In some cases, the user-interface parameters may be associated with two or more pluralities of settings—e.g., preconfigured by the user. In some cases, the mobile device may provide multiple accessibility icons for the user to choose from, where individual accessibility icons correspond to different groups of user-interface parameters selected by the user.

Various environments for managing accessibility features for mobile devices in accordance with embodiments of the present technology are illustrated in FIG. 1. Example screens of a mobile device that manages accessibility features in accordance with embodiments of the present technology are described with reference to FIG. 2. Detailed descriptions of a mobile device that manages accessibility features in accordance with embodiments of the present technology are provided with reference to FIG. 3. Flowcharts illustrating methods of managing accessibility features for mobile devices in accordance with embodiments of the present technology are described with reference to FIGS. 4 and 5.

FIG. 1 is a schematic diagram 100 illustrating various environments for managing accessibility features for mobile devices in accordance with embodiments of the present technology. The schematic diagram 100 includes a mobile device 110 of a user and several geographic areas 115 (also identified individually as areas 115a through 115c) where the mobile device 110 (e.g., the user of the mobile device 110) may be located. The mobile device 110 may be coupled with a GPS such that the mobile device 110 can determine its present geographical location. Individual areas 115 include corresponding geographical reference locations 120 (also identified individually as geographical reference locations 120a through 120c), as well as radial distances 125 (also identified individually as radial distances 125a through 125c). The mobile device 110 may include a memory to store various information related to the geographical environments—e.g., GPS coordinates of the geographical reference locations 120a through 120c, the radial distances 125a through 125c. In this example diagram 100, the reference locations 120a through 120c may represent the user's home, a movie theater, and a library, respectively, for illustration purposes only.

The mobile device 110 may include a screen configured to facilitate various interactions between the user and the mobile device 110. Further, the mobile device 110 may include various user-interface parameters configured to generate output to the user (e.g., displaying texts or graphic elements on the screen, generating sound and/or light) and/or to receive input from the user (e.g., sensing the user's touching the screen, recognizing and/or listening to the user's voice commands, perceiving the user's gestures). The user-interface parameters may include a size of one or more items to display on the screen, a volume level of the mobile device, a vibration mode of the mobile device, a brightness level of the screen, a voice-recognition sensitivity level of the mobile device, a gesture-perception sensitivity level of the mobile device, or a combination thereof. In some embodiments, the one or more items to display on the screen include a set of characters and/or a set of graphical elements that each are configured to permit access to corresponding applications included in the mobile device 110. Moreover, as one skilled in the art will readily appreciate, the user-interface parameters may also include parameters related to displaying various objects on the screen (e.g., contrasts, color schemes, graphical resolution), parameters related to saving the battery power while interfacing with the user (e.g., a duration to maintain a brightness of the screen absent user interaction, a level of remaining battery power that triggers dimming of the screen), parameters assisting the user to provide inputs (e.g., sensitivity levels for touch screen or a fingerprint validation component), or other parameters aimed to facilitate interactions with the user.

The mobile device 110 may store one or more user-interface parameters that the user chooses to adjust their settings, as well as the settings (or the values) for individual user-interface parameters the user determines to use (e.g., user-preconfigured settings). The user may choose different user-interface parameters and their settings based on various environments (surroundings, situations, geolocations)—e.g., based on the user's needs (impaired vision and/or hearing, challenged with motor skills, etc.), different tasks the user may want to carry out (writing and/or reading text messages, watching multimedia contents, etc.), moving to different locations (e.g., leaving home to go to a movie theater).

By way of example, the user may be at home (e.g., the geographical reference location 120a) and set a ringtone volume of the mobile device 110 loud (e.g., higher than a default value for the ringtone volume). The user may also configure a vibration mode and/or an illumination alert mode of the mobile device 110 sufficiently noticeable (e.g., elevated from their default values for the vibration mode and/or the illumination alert mode) such that the user can notice incoming calls (or text messages, emails, etc.). Such settings may be helpful for the user if the user experiences impaired hearing.

The mobile device 110 may generate an accessibility icon (e.g., generating data corresponding to the accessibility icon) corresponding to the ringtone volume and the vibration mode, for which the user elects to adjust settings; namely, the user may select a group of user-interface parameters to tailor the individual settings of the user-interface parameters of the group. For example, the mobile device 110 may store, in the memory of the mobile device, the settings for the ringtone volume and the vibration mode (e.g., a plurality of first settings) that the user decides to use. As such, individual first settings of the plurality each correspond to individual user-interface parameters of the group. In this regard, the accessibility icon can be considered as a liaison or a proxy for the group of user-interface parameter the user decides to adjust their settings.

The mobile device 110 may display the accessibility icon (i.e., the accessibility icon associated with the data) on the screen for the user. The mobile device 110 may also indicate that the accessibility icon has been actuated (or enabled) based on the individual user-interface parameters of the group having been set to their corresponding first settings (e.g., at least one of the user-interface parameters set differently from the default value). For example, the mobile device 110 may use a conspicuous boundary around the accessibility icon, a contrasting color for the background of the accessibility icon, or the like. Such indications may inform the user that the user-interface parameters of the group have been set to different values (or settings) from their default values (or settings).

Afterwards, the user may visit a library (e.g., the geographical reference location 120c). The user may decide to use (or restore) default values for the ringtone volume and the vibration mode of the mobile device 110—e.g., to avoid disturbing other people in case of an incoming call the user may receive while in the library. To that end, the user may de-actuate (or disable) the accessibility icon, instead of separately locating and adjusting the settings for the ringtone volume and the vibration mode to their default values, one at a time. The mobile device 110 can adjust the ringtone volume and the vibration mode to corresponding default settings stored in the mobile device, in response to the user de-actuating the accessibility icon. Further, the mobile device 110 may indicate that the accessibility icon has been de-actuated (or disabled) based on the individual user-interface parameters of the group having been set to their corresponding default values—e.g., by omitting the conspicuous boundary around the accessibility icon, by omitting the contrasting color for the background of the accessibility icon.

When the user comes back home and decides to set the ringtone volume and the vibration mode high (e.g., restore the settings the user has provided to the mobile device 110 for the ringtone volume and the vibration mode to use at home), the user may simply actuate (or enable) the accessibility icon instead of engaging the efforts of separately locating and adjusting the settings for the ringtone volume and the vibration mode, one at a time. Instead, the mobile device 110 can adjust the user-interface parameters of the group for the user based on the first settings of the plurality, in response to the user actuating the accessibility icon. In this manner, the user may actuate (or de-actuate) the accessibility icon to adjust the user-interface parameters of the group based on the settings stored in the mobile device 110 (e.g., the user preconfigured settings), instead of individually locating each and every user-interface parameter and adjusting their settings one at a time.

In some embodiments, the user can actuate (or de-actuate) the accessibility icon by touching the accessibility icon displayed on the screen, speaking to the mobile device 110, making a gesture to the mobile device 110, or any combination thereof. As such, mobile device 110 may be configured to comprehend the user's voice command and/or the user's gesture made toward the mobile device 110. To that end, the mobile device 110 may include an algorithm (e.g., an algorithm to recognize the user's voice and comprehend the user's voice commands and/or to perceive and understand gestures that the user makes toward the mobile device 110) and/or a component performing the algorithm to assist the mobile device 110. Such an algorithm may be based on an artificial intelligence (AI), a machine learning, and/or a deep learning utilizing neural networks, or the like.

In some embodiments, the mobile device 110 may associate a particular geographical location (e.g., geolocations) of the mobile device 110 with the plurality of first settings for the group of user-interface parameters. Further, if the mobile device 110 determines that the mobile device 110 is within an area including the particular geographical location, the mobile device 110 may adjust the user-interface parameters with corresponding first settings for the user. For example, the mobile device 110 may determine that the mobile device 110 is in a first area (e.g., the area 115a, at or vicinity of the user's home) within a first radial distance (e.g., the radial distance 125a) from a first geographical reference location (e.g., the geographical reference location 120a, GPS coordinates of the user's home) stored in the mobile device, based on a present location of the mobile device determined by the GPS. Subsequently, the mobile device 110 may adjust individual user-interface parameters of the group to corresponding first settings of the plurality based, at least in part, on determining that the mobile device 110 is in the first area. In some embodiments, the mobile device 110 may prompt, after determining that the mobile device is in the first area, the user whether to adjust the user-interface parameters of the group based on the first settings of the plurality, such that the mobile device 110 can adjust the user-interface parameters of the group based, at least in part, on receiving confirmation from the user.

In some embodiments, the mobile device 110 includes a set of user-interface parameters and the user may select different subsets of user-interface parameters to adjust their settings based on the user's particular needs, different environments the user may be in, and/or different tasks the user may want to carry out. As such, the mobile device 110 may generate multiple accessibility icons that each correspond to different subsets (groups, collections, etc.) of the user-interface parameters. Further, individual subsets of the user-interface parameters may be associated with corresponding pluralities of settings.

For example, the mobile device 110 may generate a first accessibility icon corresponding to a first subset of user-interface parameters selected by the user (e.g., the ringtone volume, the vibration level). The mobile device 110 may store a first plurality of settings provided by the user, where individual settings of the first plurality each correspond to individual user-interface parameters of the first subset. The mobile device 110 may also generate a second accessibility icon corresponding to a second subset of user-interface parameters selected by the user (e.g., the ringtone volume, the illumination alert level, the font size of text messages). The mobile device 110 may also store a second plurality of settings provided by the user, where individual settings of the second plurality each correspond to individual user-interface parameters of the second subset. Similarly, the mobile device 110 may generate additional (e.g., three (3), four (4), or even more) accessibility icons based on the user's input.

Further, the mobile device 110 may display the accessibility icons it has generated on the screen such that the user can choose one of the displayed accessibility icons to actuate (or de-actuate). In this manner, the user may adjust various user-interface parameters to different user-preconfigured settings based on different situations and/or circumstances, by actuating/de-actuating (or enabling/disabling) a particular accessibility icon among the displayed accessibility icons. In some embodiments, if the user actuates (enables) the first accessibility icon, the mobile device 110 may de-actuate (disable) the second accessibility icon, or vice versa.

Table 1 illustrates a subset of user-interface parameters ("Parameters") and their settings (values) for an example accessibility icon in accordance with embodiments of the present technology. The mobile device 110 may include a set of user-interface parameters a through n. The user may select one or more user-interface parameters (e.g., Parameter i, Parameter j, and Parameter k) out of the user-interface parameters a through n to adjust to certain values—e.g., L (low or mute if applicable), M (medium), H (high). Further, the user may set each user-interface parameter to its default values (D). The mobile device 110 may be configured to store contents of Table 1 in a memory included in the mobile device 110—e.g., the subset of user-interface parameters including Parameter i, Parameter j, and Parameter k, as well as corresponding settings and modes.

TABLE 1

|  | Mode 1 | Mode 2 | Mode 3 | Mode 4 |
| --- | --- | --- | --- | --- |
| Parameter i | L | M | L | D |
| Parameter j | D | M | L | D |
| Parameter k | H | D | L | M |

For example, the user may set Parameter i, Parameter j, and Parameter k to L, D, and H, respectively, while the user is at home exchanging text messages. Further, the user may designate such a combination of the user-interface parameters and corresponding settings (e.g., Parameter i, Parameter j, and Parameter k set to L, D, and H, respectively) as a first mode (e.g., Mode 1). In some cases, the combination (e.g., Mode 1) may be regarded as an accessibility profile including information necessary to adjust a certain collection of the user-interface parameters (e.g., Parameter i, Parameter j, and Parameter k) to corresponding user-preconfigured settings or user-specified levels (e.g., L, D, and H, respectively). In this manner, the user may establish multiple accessibility profiles to account for different usage of the mobile device 110 and/or usage scenarios.

In some case, the mobile device 110 may associate different modes (or accessibility profiles) with different geographical information (e.g., geolocations). For example, the mobile device 110 may associate the first mode (e.g., Mode 1) with the geographical information related to the user's home (e.g., the area 115a including the geographical reference location 120a, GPS coordinates of the geographical reference location 120a).

Further, the user may set the user-interface parameters to M, M, and D, respectively, while the user is at home watching multimedia contents. The user may designate the combination (e.g., Parameter i, Parameter j, and Parameter k set to M, M, and D, respectively) as a second mode (e.g., Mode 2), for which the mobile device 110 may associate with the same geographical information as Mode 1.

Similarly, the user may set the user-interface parameters to L, L, and L, respectively, while the user is at a movie theater. The user may designate the combination (e.g., Parameter i, Parameter j, and Parameter k set to L, L, and L, respectively) as Mode 3, for which the mobile device 110 may associate with the geographical information related to the movie theater (e.g., the area 115b including the geographical reference location 120b, GPS coordinates of the geographical reference location 120b). Also, the user may set the user-interface parameters to D, D, and M, respectively, while the user is at a library. The user may designate the combination (e.g., Parameter i, Parameter j, and Parameter k set to D, D, and M, respectively) as Mode 4, for which the mobile device 110 may associate with the geographical information related to the library (e.g., the area 115c including the geographical reference location 120c, GPS coordinates of the geographical reference location 120c).

In some embodiments, instead of designating different modes (e.g., modes 1 through 4) for the subset of user-interface parameters, which corresponds to the accessibility icon, the mobile device 110 may generate different accessibility icons (e.g., four (4) different accessibility icons) corresponding to individual modes. Further, the mobile device 110 may generate different accessibility icons if the user selects a different subset of user-interface parameters (e.g., Parameter a, Parameter b, Parameter g, and Parameter k out of the user-interface parameters a through n) to adjust their settings.

Although in the forgoing example embodiment, the accessibility icon is described to correspond to three (3) user-interface parameters and four (4) modes, in other embodiments, accessibility icons may correspond to different quantities of user-interface parameters and different quantities of modes. For example, an accessibility icon may correspond to one (1) user-interface parameter and one (1) mode. In another example, an accessibility icon may correspond to one (1) user-interface parameter and multiple modes (e.g., two (2), three (3), or even more). In yet another example, an accessibility icon may correspond to one (1) mode and multiple user-interface parameters (e.g., two (2), three (3), or even more). Further, the example circumstances described above for different modes are illustration purposes only and the present technology is not limited thereto. For example, the subset of user-interface parameters may represent a first group of user-interface parameters for a user with an impaired vision, a second group of user-interface parameters for a user with difficulties in hand-motions (e.g., due to Parkinson's disease), a third group of user-interface parameters when a user works at his/her workplace, a fourth group of user-interface parameters when a user exercises in a health club, or the like.

Figure 2:
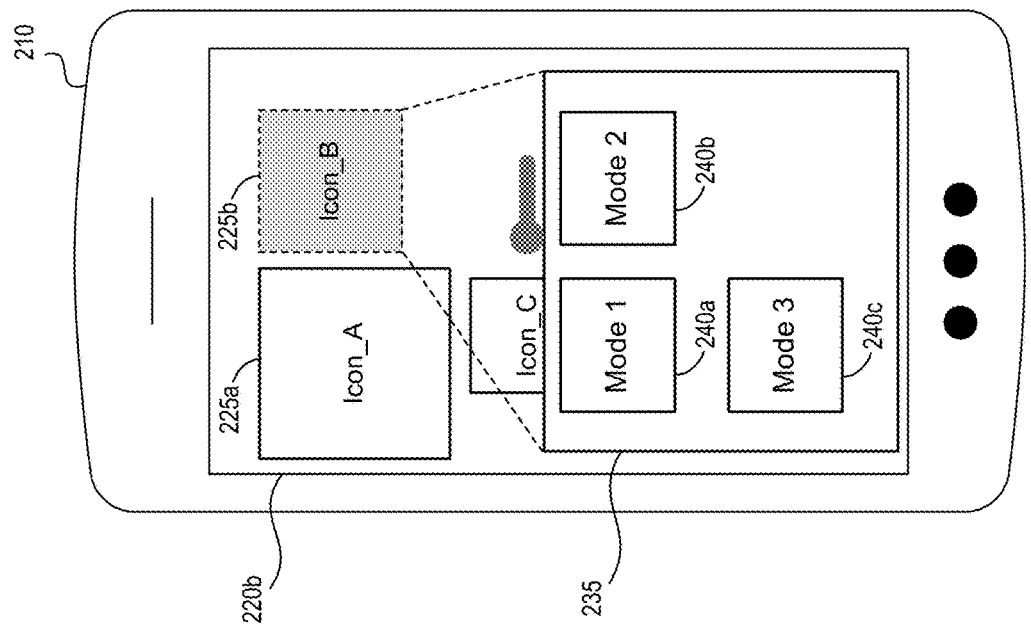
FIG. 2 illustrates example screens of a mobile device that supports managing accessibility features in accordance with embodiments of the present technology.
Figure 2:
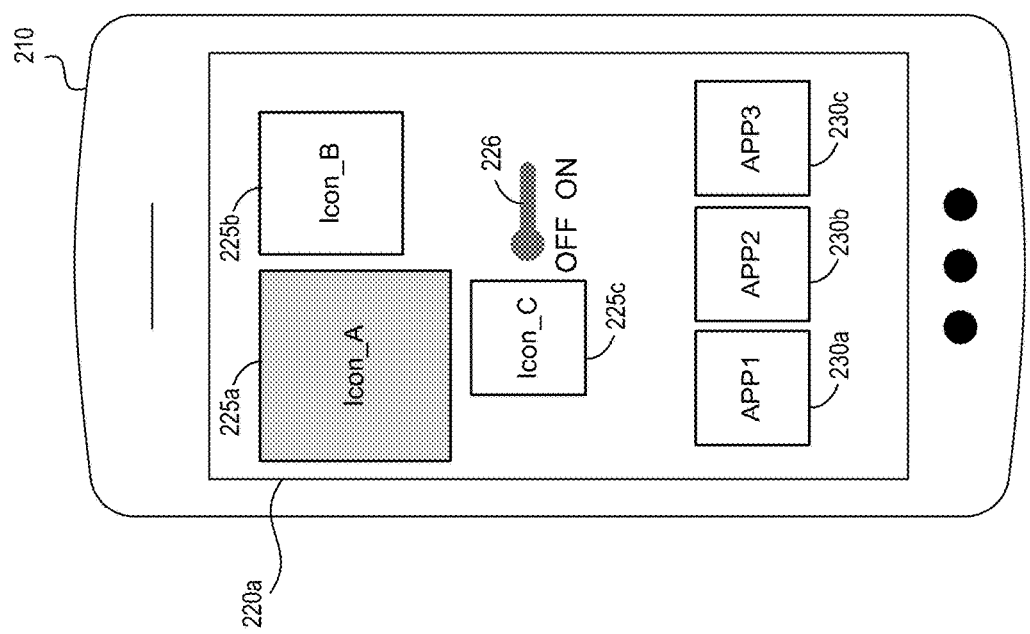

FIG. 2 illustrates example screens 220 of a mobile device 210 that manages accessibility features in accordance with embodiments of the present technology. The mobile device 210 may be an example of or include aspects of the mobile device 110. In some embodiments, the screens 220 may be a first screen that appears, in response to the user activating the mobile device 210—e.g., a primary screen of the mobile device 210.

The screen 220a of the mobile device 210 depicts three (3) accessibility icons 225 (also identified individually as accessibility icons 225a through 225c)—e.g., the mobile device 210 may have generated a first data set corresponding to the accessibility icon 225a, a second data set corresponding to the accessibility icon 225b, and the third data set corresponding to the accessibility icon 225c. Further, the screen 220a depicts three (3) graphical elements 230 (also identified individually as graphical elements 230a through 230c), each of which is configured to permit access to a corresponding application included in the mobile device 210. In the example screen 220a, the graphical elements 230 is displayed using a default size.

In some embodiments, the mobile device 210 may display accessibility icons 225 (e.g., accessibility icons 225a through 225c associated with the first, second, third data sets, respectively) in various sizes. For example, the screen 220a depicts the accessibility icon 225c displayed using the default size of the graphical elements 230, while sizes of the accessibility icons 225a and 225b has been enlarged—e.g., the size of accessibility icon 225a has been enlarged larger than that of the accessibility icons 225b and 225c, the size of accessibility icon 225b has been enlarged larger than that of the accessibility icon 225c. In some embodiments, the mobile device 210 may enlarge the size of accessibility icons 225 from a default size (e.g., the default size of the graphical elements 230). For example, the mobile device 210 may use a predetermined factor to enlarge the size of the accessibility icons 225—e.g., a predetermined factor provided by the user, a predetermined factor based on a quantity of accessibility icons 225 to display. In some embodiments, the mobile device 210 may provide a zoom feature after displaying the accessibility icons 225 such that the user may enlarge certain accessibility icons 225 to a size of his/her choice.

In some embodiments, the mobile device 210 may indicate a particular accessibility icon is actuated (enabled)—e.g., at least one of the user-interface parameters corresponding to the accessibility icon has been set to a value different from a default value. For example, the screen 220a depicts the accessibility icon 225a in a different contrast (e.g., darker) when compared to the accessibility icons 225b and 225c, to indicate the accessibility icon 225a has been actuated. As described with reference to FIG. 1, the mobile device 210 may have actuated the accessibility icon 225a, in response to the user touching the accessibility icon 225a, speaking to the mobile device 210, making a gesture to the mobile device 210, or any combination thereof. In some embodiments, the accessibility icons may be accompanied with a toggle switch (or a graphical element suitable for the user to actuate (or de-actuate) the accessibility icon). For example, a toggle switch 226 is displayed next to the accessibility icon 225c, such that the user can actuate (or de-actuate) the accessibility icon 225c by shifting (or moving) the gray circle included in the toggle switch 226 left or right (otherwise toggle).

The screen 220b of the mobile device 210 depicts that one or more accessibility icons 225 may be configured to display an additional window on the screen 220, in response to the user selecting the accessibility icons 225. Further, the additional window may be configured for the user to select between multiple modes associated with the accessibility icons 225 (e.g., Mode 1 including the plurality of first settings, Mode 2 including the plurality of second settings).

For example, if the user touches the accessibility icon 225b to actuate the accessibility icon 225b, the mobile device 210 can indicate that the accessibility icon 225b is actuated (e.g., highlighting the accessibility icon 225b in a different contrast when compared to the accessibility icon 225a, which is no longer actuated, or the accessibility icon 225c) and display an additional window 235 based on multiple settings available for a group of user-interface parameters corresponding to the accessibility icon 225b. That is, the mobile device 210 provides options for the user to select one of the modes—e.g., Mode 1, Mode 2, and Mode 3, corresponding to three (3) different settings for the group of user-interface parameters corresponding to the accessibility icon 225b.

In some cases, the mobile device 210 may reduce a quantity of the options based on information associated with the modes. For example, if the mobile device 210 determines that the mobile device 210 is in a first area (e.g., the area 115a including the geographical reference location 120a, near the GPS coordinates of the geographical reference location 120a), the mobile device 210 may display one or more modes that are associated with the first area—i.e., the mobile device 210 may omit to display other modes that are not associated with the first area.

Figure 3:
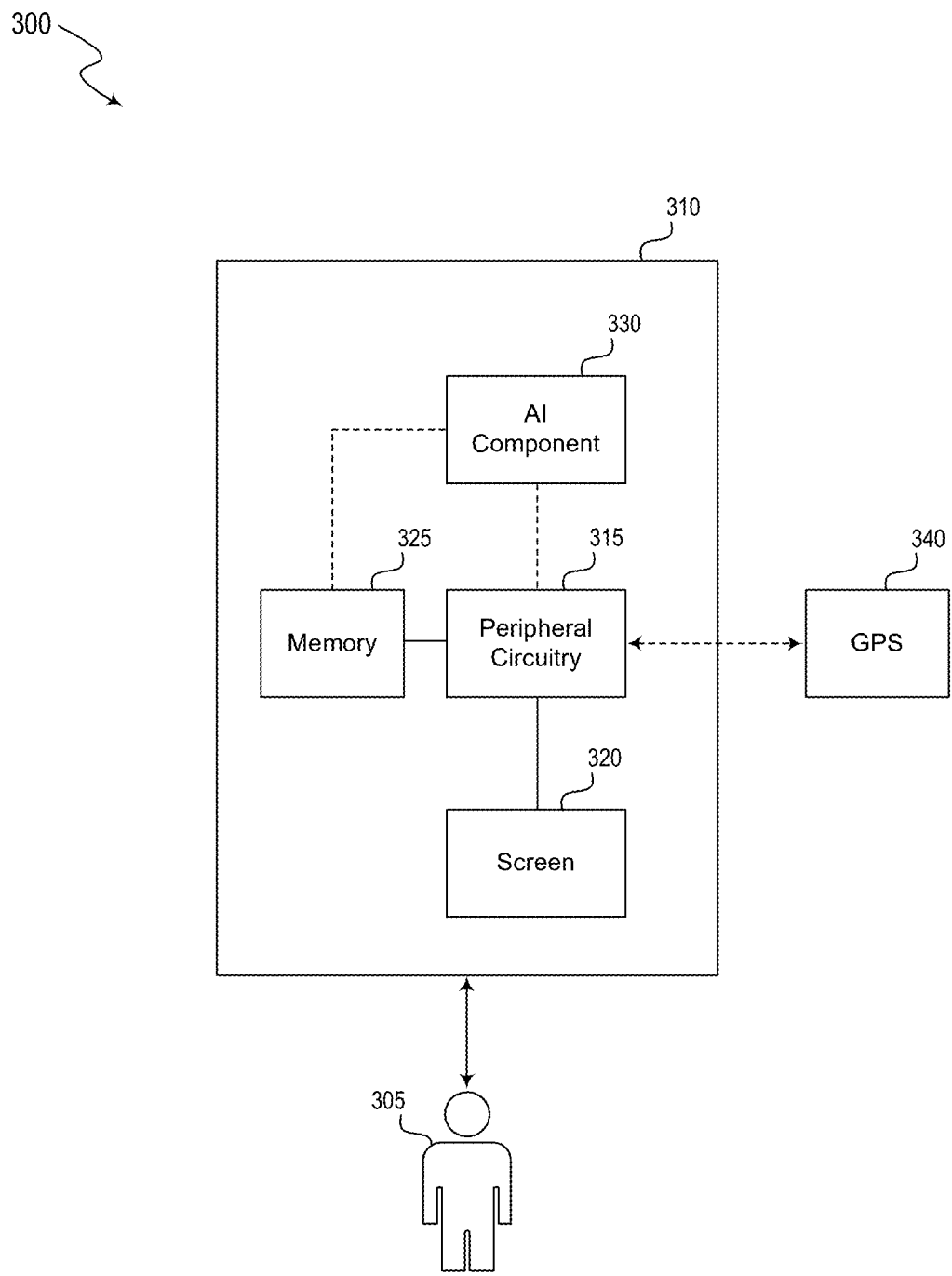
FIG. 3 is a block diagram of a mobile device that supports managing accessibility features in accordance with embodiments of the present technology.

FIG. 3 is a block diagram 300 of a mobile device 310 that manages accessibility features in accordance with embodiments of the present technology. The mobile device 310 may be an example of or include aspects of the mobile devices 110 and/or 210 described with reference to FIGS. 1 and 2. The diagram 300 also illustrates a user 305 of the mobile device 310. The mobile device 310 may include a peripheral circuitry 315, a screen 320, and a memory 325. Further, the mobile device 310 may be coupled with a GPS 340 such that the mobile device 310 may determine its current geographical location. In some embodiments, the mobile device 310 includes an AI component 330.

The mobile device 310 can manage various accessibility features (or user-interface parameters) configured to generate an output to the user 305 or to receive an input from the user 305, or both. Such accessibility features may include a size of one or more items (e.g., a set of characters, a set of graphical elements (or icons) that each are configured to permit access to corresponding applications included in the mobile device 310) to display on the screen 320, a volume level, a vibration mode, an illumination alert mode, a brightness level of the screen 320, a voice-recognition sensitivity level, a gesture-perception sensitivity level, or a combination thereof.

The screen 320 may be an example of or include aspects of the screens 220 described with reference to FIG. 2. The screen 320 may be configured to perform various tasks related to interfacing with the user 305. In some embodiments, the screen 320 displays one or more accessibility icons for the user 305. The user 305 may actuate (or de-actuate) the accessibility icons by touching the accessibility icons displayed on the screen 320 or a toggling switch displayed on the screen 320 that may accompany the accessibility icons. In some embodiments, the user 305 may use a zoom feature to enlarge a size of the accessibility icons displayed on the screen 320.

The memory 325 may be configured to store various information related to the geographical environments—e.g., GPS coordinates of the geographical reference locations 120a through 120c, the radial distances 125a through 125c. Further, the memory 325 may be configured to store various settings (e.g., first settings, second settings, etc.) for the user-interface parameters that the user 305 selects to adjust—e.g., based on particular needs of the user 305, different environments the user 305 may be in, and/or different tasks the user 305 may want to carry out, as described with reference to FIG. 1 and Table 1. Moreover, the memory 325 may store default settings (or values) for the user-interface parameters of the mobile device 310.

The peripheral circuitry 315 (which may also be referred to as a processor 315) may be configured to generate a first accessibility icon (e.g., one of the accessibility icons 225) corresponding to a group of user-interface parameters selected by the user 305. In this regard, the processor 315 may have generated a first data set corresponding to the first accessibility icon. The peripheral circuitry 315 may store, in the memory 325, a plurality of first settings provided by the user 305, where individual first settings of the plurality each correspond to individual user-interface parameters of the group. Further, the peripheral circuitry 315 may display the first accessibility icon on the screen 320—e.g., the first accessibility icon associated with the first data set. In some embodiments, the peripheral circuitry 315 may adjust the user-interface parameters of the group based on the first settings of the plurality, in response to the user actuating (e.g., enabling) the first accessibility icon. Similarly, the peripheral circuitry 315 may adjust the user-interface parameters of the group to corresponding default settings stored in the memory, in response to the user de-actuating (e.g., disabling) the first accessibility icon. In some embodiments, the peripheral circuitry 315 may adjust the user-interface parameters of the group to corresponding default settings stored in the memory 325, in response to the user actuating a second accessibility icon displayed on the screen 320—e.g., the second accessibility icon associated with a second data set that the processor 315 has generated to form and display the second accessibility icon.

In some embodiments, the user 305 may actuate (or de-actuate) the first (or the second) accessibility icon by touching the first (or the second) accessibility icon, speaking to the mobile device 310, making a gesture to the mobile device 310, or any combination thereof. Accordingly, the mobile device 310 may be configured to comprehend the user's voice command to the mobile device 310 and/or the user's gesture made toward the mobile device 310. The mobile device 310 may include a microphone (e.g., a transducer configured to convert acoustic signal of the voice command to electrical signal) and/or an imaging device to perceive the gesture from the user 305. Such an imaging device may include a camera of the mobile device 310 and/or other components suitable for capturing gestures of the user 305—e.g., an infrared sensor coupled with an illumination source, image sensors utilizing active-pixel sensors (e.g., MOS-based) and/or charge-coupled devices (CCDs), or the like.

In some embodiments, the peripheral circuitry 315 may be configured to determine that the mobile device 310 is in a first area within a first radial distance from a first geographical reference location stored in the memory 325 based on a present location of the mobile device determined by the GPS 340. In some cases, the user 305 may provide the radial distances for the peripheral circuitry 315 to use in determining whether the mobile device 310 is within a certain area. Moreover, the peripheral circuitry 315 may be configured to adjust the user-interface parameters of the group based on the first settings of the plurality, based on determining that the mobile device is in the first area. In some embodiments, after determining that the mobile device 310 is in the first area, the peripheral circuitry 315 may prompt the user 305 whether to adjust the user-interface parameters of the group based on the first settings of the plurality, such that adjusting the user-interface parameters of the group is also based on receiving confirmation from the user 305.

The AI component 330 may include an algorithm and/or a processor performing the algorithm that assists the mobile device 110 to comprehend the user's voice command to the mobile device 310 and/or the user's gesture made toward the mobile device 310. Such an algorithm may be based on an artificial intelligence, a machine learning, and/or a deep learning utilizing neural networks, or the like. Moreover, the AI component 330 may assist the peripheral circuitry 315 to determine a suitable radial distance to use to determine whether the mobile device 310 is in a certain area (e.g., areas 115), based on the user's pattern of moving and/or the user's pattern of spending time within different areas (e.g., the areas 115a through 115c).

Figure 4:
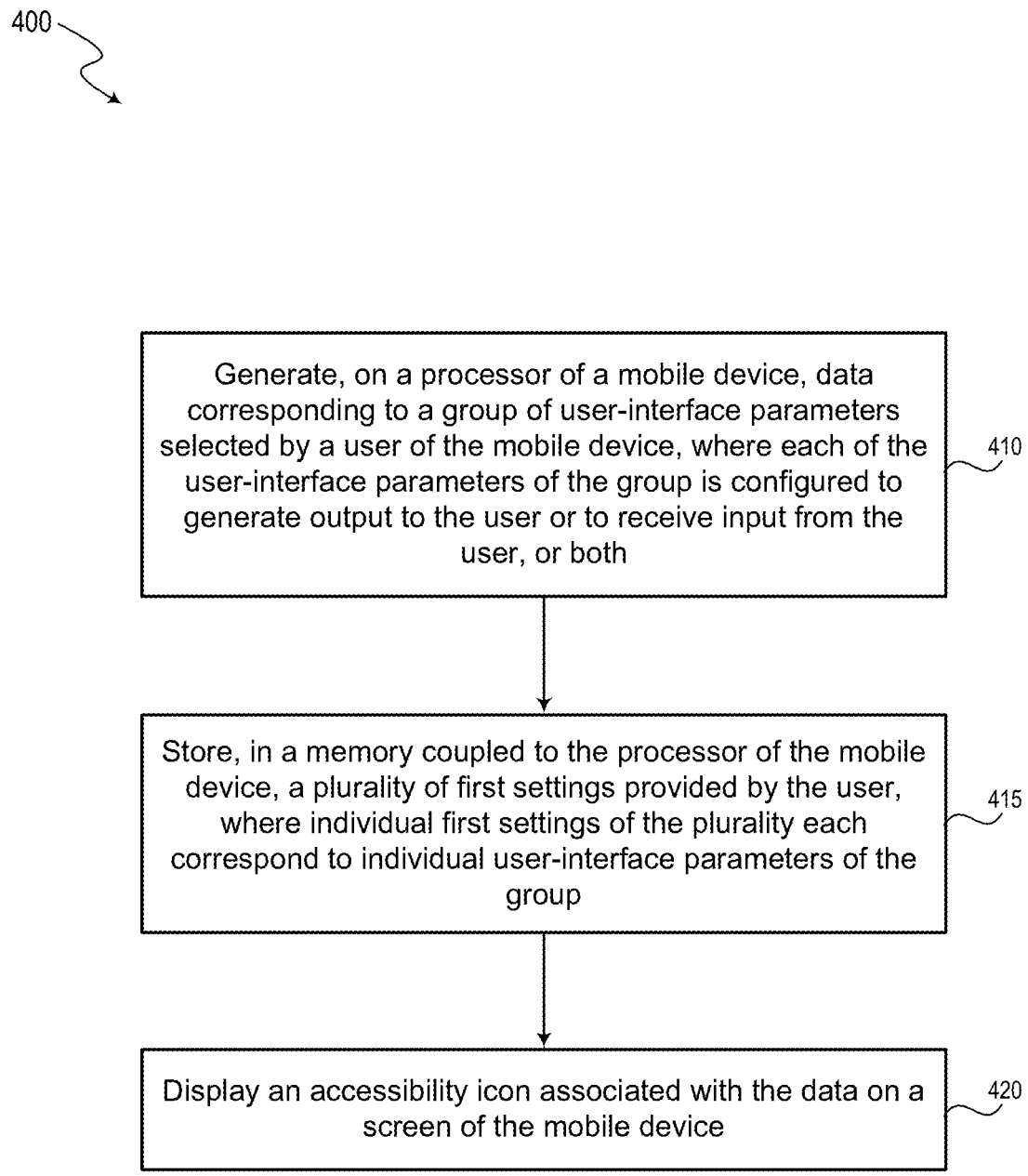
FIGS. 4 and 5 are flowcharts of methods of managing accessibility features for mobile devices in accordance with embodiments of the present technology.

FIG. 4 is a flowchart 400 illustrating a method of managing accessibility features for mobile devices in accordance with embodiments of the present technology. The flowchart 400 may be an example of or include aspects of a method that a mobile device (e.g., the mobile device 110, the mobile device 210, the mobile device 310) may perform as described with reference to FIGS. 1 through 3.

The method includes generating, on a processor of a mobile device, data corresponding to a group of user-interface parameters selected by a user of the mobile device, where each of the user-interface parameters of the group is configured to generate output to the user or to receive input from the user, or both. (box 410). In accordance with one aspect of the present technology, the generating feature of box 410 can be performed by the mobile device, in conjunction with the peripheral circuitry 315 in some cases, as described with reference to FIGS. 1 through 3.

The method further includes storing, in a memory coupled to the processor of the mobile device, a plurality of first settings provided by the user, where individual first settings of the plurality each correspond to individual user-interface parameters of the group (box 415). In accordance with one aspect of the present technology, the storing feature of box 415 can be performed by the mobile device, in conjunction with the peripheral circuitry 315 and/or the memory 325 in some cases, as described with reference to FIGS. 1 through 3.

The method further includes displaying an accessibility icon associated with the data on a screen of the mobile device (box 420). In accordance with one aspect of the present technology, the displaying feature of box 420 can be performed by the mobile device, in conjunction with the peripheral circuitry 315 and/or the screen 320 in some cases, as described with reference to FIGS. 1 through 3.

In some embodiments, the method may further include adjusting the user-interface parameters of the group based on first settings of the plurality, in response to the user actuating the accessibility icon. In some embodiments, the user actuating the accessibility icon includes touching the accessibility icon, speaking to the mobile device, making a gesture to the mobile device, or any combination thereof. In some embodiments, the method may further include adjusting the user-interface parameters of the group to corresponding default settings stored in the memory, in response to the user de-actuating the accessibility icon.

In some embodiments, the user-interface parameters of the group includes a size of one or more items to display on the screen, a volume level of the mobile device, a vibration mode of the mobile device, a brightness level of the screen, a voice-recognition sensitivity level of the mobile device, a gesture-perception sensitivity level of the mobile device, or a combination thereof. In some embodiments, the one or more items to display on the screen include a set of characters, a set of graphical elements that each are configured to permit access to corresponding applications that the mobile device includes, or both.

In some embodiments, the method may further include determining that the mobile device is in a first area within a first radial distance from a first geographical reference location stored in the mobile device based on a present location of the mobile device determined by a GPS coupled with the mobile device. In some embodiments, the method may further include adjusting the user-interface parameters of the group based on the first settings of the plurality based, at least in part, on determining that the mobile device is in the first area.

In some embodiments, the method may further include prompting, after determining that the mobile device is in the first area, the user whether to adjust the user-interface parameters of the group based on the first settings of the plurality, where adjusting the user-interface parameters of the group is also based, at least in part, on receiving confirmation from the user. In some embodiments, displaying the accessibility icon on the screen includes enlarging the accessibility icon from a first size to a second size greater than the first size, where other icons displayed on the screen have the first size. In some embodiments, displaying the accessibility icon on the screen includes displaying the accessibility icon on a first screen that appears, in response to the user activating the mobile device. In some embodiments, the method may further include storing, in the memory, a plurality of second settings provided by the user, where individual second settings of the plurality each correspond to individual user-interface parameters of the group.

In some embodiments, the plurality of first settings is associated with a first geographical reference location stored in the memory device, and where the plurality of second settings is associated with a second geographical reference location stored in the memory device. In some embodiments, the accessibility icon is configured to display an additional window on the screen, in response to the user selecting the accessibility icon, the additional window configured for the user to select between the plurality of first settings or the plurality of second settings.

Figure 5:
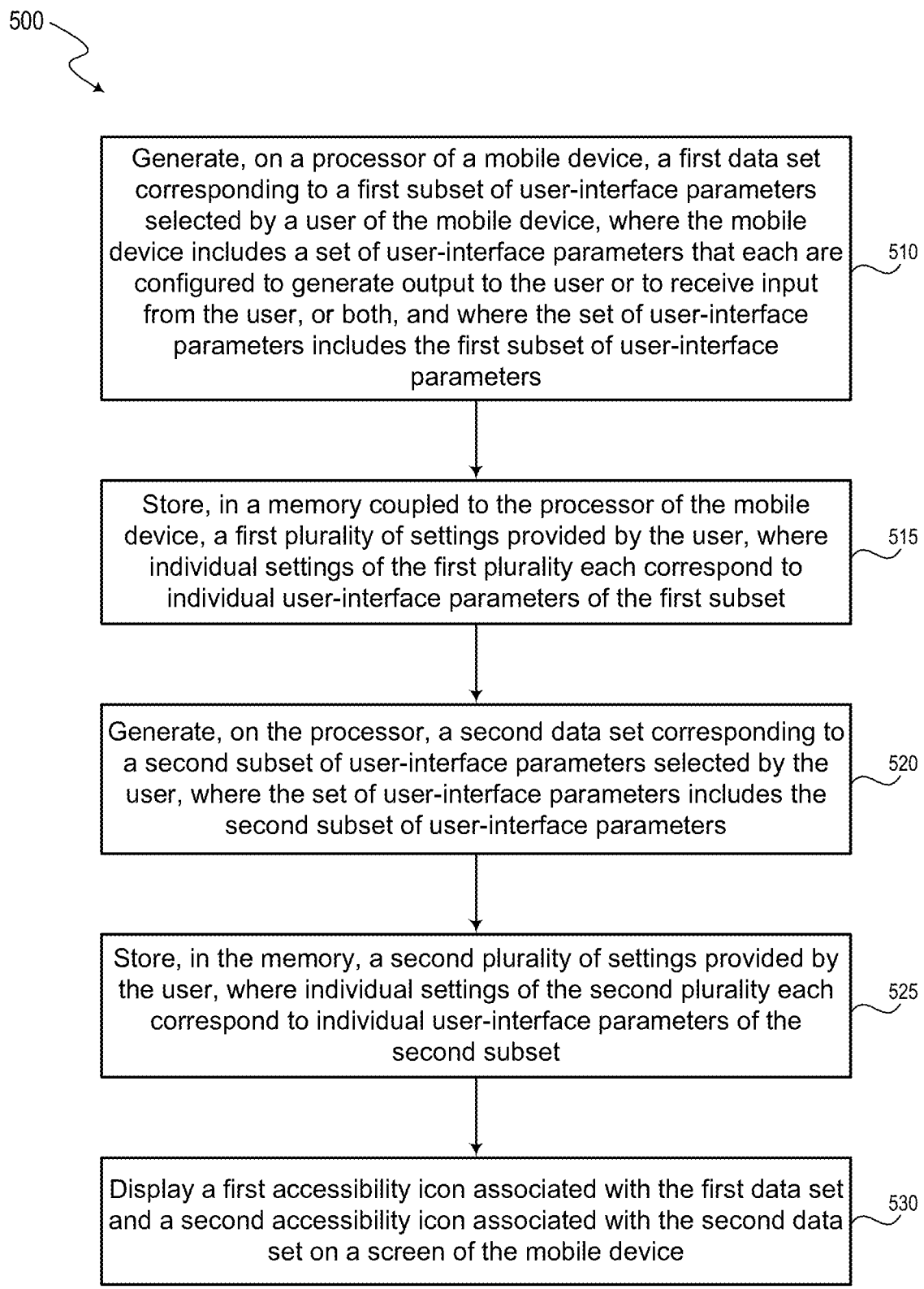

FIG. 5 is a flowchart 500 illustrating a method of managing accessibility features for mobile devices in accordance with embodiments of the present technology. The flowchart 500 may be an example of or include aspects of a method that a mobile device (e.g., the mobile device 110, the mobile device 210, the mobile device 310) may perform as described with reference to FIGS. 1 through 3.

The method includes generating, on a processor of a mobile device, a first data set corresponding to a first subset of user-interface parameters selected by a user of the mobile device, where the mobile device includes a set of user-interface parameters that each are configured to generate output to the user or to receive input from the user, or both, and where the set of user-interface parameters includes the first subset of user-interface parameters (box 510). In accordance with one aspect of the present technology, the generating feature of box 510 can be performed by the mobile device, in conjunction with the peripheral circuitry 315 in some cases, as described with reference to FIGS. 1 through 3.

The method further includes storing, in a memory coupled to the processor of the mobile device, a first plurality of settings provided by the user, where individual settings of the first plurality each correspond to individual user-interface parameters of the first subset (box 515). In accordance with one aspect of the present technology, the storing feature of box 515 can be performed by the mobile device, in conjunction with the peripheral circuitry 315 and/or the memory 325 in some cases, as described with reference to FIGS. 1 through 3.

The method further includes generating, on the processor, a second data set corresponding to a second subset of user-interface parameters selected by the user, where the set of user-interface parameters includes the second subset of user-interface parameters (box 520). In accordance with one aspect of the present technology, the setting feature of box 520 can be performed by the mobile device, in conjunction with the peripheral circuitry 315 and/or the memory 325 in some cases, as described with reference to FIGS. 1 through 3.

The method further includes storing, in the memory, a second plurality of settings provided by the user, where individual settings of the second plurality each correspond to individual user-interface parameters of the second subset (box 525). In accordance with one aspect of the present technology, the storing feature of box 525 can be performed by the mobile device, in conjunction with the peripheral circuitry 315 and/or the memory 325 in some cases, as described with reference to FIGS. 1 through 3.

The method further includes displaying a first accessibility icon associated with the first data set and a second accessibility icon associated with the second data set on a screen of the mobile device (box 530). In accordance with one aspect of the present technology, the setting feature of box 530 can be performed by the mobile device, in conjunction with the peripheral circuitry 315 and/or the screen 320 in some cases, as described with reference to FIGS. 1 through 3.

It should be noted that the methods described above describe possible implementations, and that the operations and the steps may be rearranged or otherwise modified and that other implementations are possible. Furthermore, embodiments from two or more of the methods may be combined.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing, it will be appreciated that specific embodiments of the invention have been described herein for purposes of illustration, but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

What is claimed is:

1. A method, comprising:
   generating, on a processor of a mobile device, a first data set including a first subset of user-interface parameters selected by a user of the mobile device, wherein the mobile device includes a set of user-interface parameters that each is configured to generate output to the user or to receive input from the user, or both, and wherein the set of user-interface parameters includes the first subset of user-interface parameters;
   storing, in a memory coupled to the processor of the mobile device, a first plurality of settings provided by the user, wherein individual settings of the first plurality each corresponds to individual user-interface parameters of the first subset;
   generating, on the processor, a second data set including a second subset of user-interface parameters selected by the user, wherein the set of user-interface parameters includes the second subset of user-interface parameters;
   storing, in the memory, a second plurality of settings provided by the user, wherein individual settings of the second plurality each corresponds to individual user-interface parameters of the second subset;
   storing, in the memory, a third plurality of settings provided by the user, wherein individual settings of the third plurality each corresponds to the individual user-interface parameters of the second subset;
   determining a first size of a first accessibility icon to be displayed on a screen of the mobile device, wherein the first size is greater than a default size, wherein the first size is based on a first predetermined factor provided by the user, and wherein the first accessibility icon is associated with the first data set including the first subset of user-interface parameters;
   determining a second size of a second accessibility icon to be displayed on the screen, wherein the second size is less than the first size and is greater than the default size, wherein the second size is based on a second predetermined factor provided by the user, wherein the second accessibility icon is associated with the second data set including the second subset of user-interface parameters, wherein the second accessibility icon is configured to display an additional window on the screen, in response to the user selecting the second accessibility icon, the additional window configured for the user to select between the second plurality of settings or the third plurality of settings, and wherein both the second and third pluralities of settings are associated with a first area within a first radial distance from a first geographical reference location stored in the mobile device based on a first present location of the mobile device determined by a global positioning system (GPS) coupled with the mobile device; and
   displaying the first and second accessibility icons on the screen of the mobile device.

2. The method of claim 1, further comprising:
   adjusting the user-interface parameters of the first subset based on the settings of the first plurality, in response to the user actuating the first accessibility icon.

3. The method of claim 2, wherein the user actuating the first accessibility icon includes touching the first accessibility icon, speaking to the mobile device, making a gesture to the mobile device, or a combination thereof.

4. The method of claim 1, further comprising:
   adjusting the user-interface parameters of the first subset to corresponding default settings stored in the memory, in response to the user de-actuating the first accessibility icon.

5. The method of claim 1, wherein the user-interface parameters of the set includes a size of one or more items to display on the screen, a volume level of the mobile device, a vibration mode of the mobile device, a brightness level of the screen, a voice-recognition sensitivity level of the mobile device, a gesture-perception sensitivity level of the mobile device, a duration to maintain the brightness level of the screen, a level of remaining battery power to trigger dimming of the screen, a sensitivity level for detecting touch input on the screen, a sensitivity level for detecting a fingerprint at a validation component, or a combination thereof.

6. The method of claim 5, wherein the one or more items to display on the screen include a set of characters, a set of graphical elements that each is configured to permit access to corresponding applications that the mobile device includes, or both.

7. The method of claim 1, further comprising:
   determining that the mobile device is in a second area within a second radial distance from a second geographical reference location stored in the mobile device based on a second present location of the mobile device determined by the GPS; and
   adjusting the user-interface parameters of the first subset based on the settings of the first plurality based, at least in part, on determining that the mobile device is in the second area.

8. The method of claim 7, further comprising:
   prompting, after determining that the mobile device is in the second area, the user whether to adjust the user-interface parameters of the first subset based on the settings of the first plurality, wherein adjusting the user-interface parameters of the first subset is also based, at least in part, on receiving confirmation from the user.

9. The method of claim 1, wherein displaying the first and second accessibility icons on the screen includes:
  displaying the first and second accessibility icons on a first screen that appears, in response to the user activating the mobile device.

10. A mobile device, comprising:
  a screen;
  a memory; and
  a processor coupled to the memory and configured to:
    generate a first data set including a first subset of user-interface parameters selected by a user of the mobile device, wherein the mobile device includes a set of user-interface parameters that each is configured to generate output to the user or to receive input from the user, or both, and wherein the set of user-interface parameters includes the first subset of user-interface parameters;
    store, in the memory, a first plurality of settings provided by the user, wherein individual settings of the first plurality each corresponds to individual user-interface parameters of the first subset;
    generate a second data set including a second subset of user-interface parameters selected by the user, wherein the set of user-interface parameters includes the second subset of user-interface parameters;
    store, in the memory, a second plurality of settings provided by the user, wherein individual settings of the second plurality each corresponds to individual user-interface parameters of the second subset;
    store, in the memory, a third plurality of settings provided by the user, wherein individual settings of the third plurality each corresponds to the individual user-interface parameters of the second subset;
    determine a first size of a first accessibility icon to be displayed on the screen, wherein the first size is greater than a default size, wherein the first size is based on a first predetermined factor provided by the user, and wherein the first accessibility icon is associated with the first data set including the first subset of user-interface parameters;
    determine a second size of a second accessibility icon to be displayed on the screen, wherein the second size is less than the first size and is greater than the default size, wherein the second size is based on a second predetermined factor provided by the user, wherein the second accessibility icon is associated with the second data set including the second subset of user-interface parameters, wherein the second accessibility icon is configured to display an additional window on the screen, in response to the user selecting the second accessibility icon, the additional window configured for the user to select between the second plurality of settings or the third plurality of settings, and wherein both the second and third pluralities of settings are associated with a first area within a first radial distance from a first geographical reference location stored in the mobile device based on a first present location of the mobile device determined by a global positioning system (GPS) coupled with the mobile device; and
    display the first and second accessibility icons on the screen.

11. The mobile device of claim 10, wherein the user-interface parameters of the set includes a size of characters or graphical elements to display on the screen, a volume level of the mobile device, a vibration mode of the mobile device, a brightness level of the screen, a voice-recognition sensitivity level of the mobile device, a gesture-perception sensitivity level of the mobile device, a duration to maintain the brightness level of the screen, a level of remaining battery power to trigger dimming of the screen, a sensitivity level for detecting touch input on the screen, a sensitivity level for detecting a fingerprint at a validation component, or a combination thereof.

12. The mobile device of claim 10, wherein the processor is configured to:
  adjust the user-interface parameters of the first subset based on the settings of the first plurality, in response to the user actuating the first accessibility icon; or
  adjust the user-interface parameters of the first subset to corresponding default settings stored in the memory, in response to the user de-actuating the first accessibility icon.

13. The mobile device of claim 10, wherein the processor is configured to:
  determine that the mobile device is in a second area within a second radial distance from a second geographical reference location stored in the mobile device based on a second present location of the mobile device determined by the GPS; and
  adjust the user-interface parameters of the first subset based on the settings of the first plurality based, at least in part, on determining that the mobile device is in the second area.

14. The mobile device of claim 13, wherein the processor is configured to:
  prompt, after determining that the mobile device is in the second area, the user whether to adjust the user-interface parameters of the first subset based on the settings of the first plurality, wherein adjusting the user-interface parameters of the first subset is also based, at least in part, on receiving confirmation from the user.

* * * * *